Figure 1:
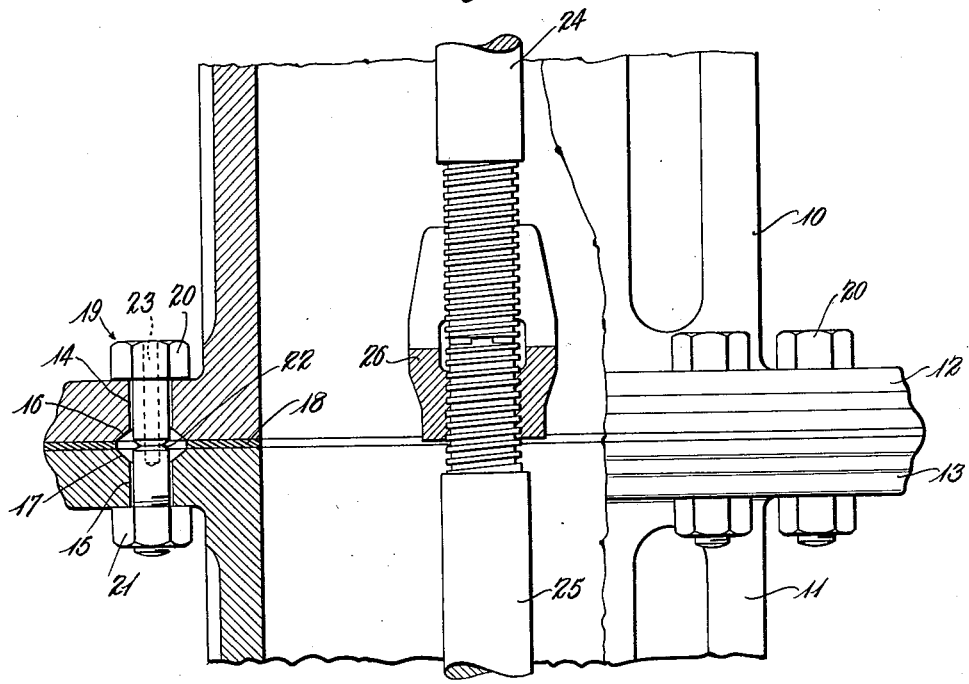

June 8, 1937.  E. E. CLINE  2,083,054

FIRE HYDRANT

Filed May 20, 1936

Inventor
Earl E. Cline

By Cushman, Darby, & Cushman
Attorneys

Patented June 8, 1937

2,083,054

UNITED STATES PATENT OFFICE 2,083,054

FIRE HYDRANT

Earl E. Cline, Decatur, Ill., assignor to Mueller Co., Decatur, Ill., a corporation of Illinois Application May 20, 1936, Serial No. 80,874

2 Claims. (Cl. 285—139)

The present invention relates to fire hydrants and particularly to a joint for connecting the portions of a sectional fire hydrant stock or barrel. According to the invention the stock portions, which are in end to end relation, have adjacent flanges apertured to receive connecting bolts, the bolts being weakened in a manner which will be hereinafter described so that upon forceful impact, as by a vehicle, the bolts will break and thus prevent undue breakage or disturbance of the parts of the stock.

In order that the invention may be clearly understood, I have shown a practical embodiment thereof, by way of example, in the accompanying drawing.

Figure 2:
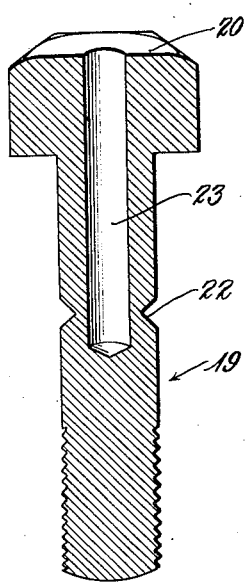

In the drawing:

Figure 1 is a view partly in elevation and partly in axial section of a stock constructed in accordance with the present invention, and Figure 2 is an axial section of a connection bolt.

To refer to the drawing, the stock or barrel comprises upper and lower portions 10 and 11 which at their adjacent ends are provided with radially extending annular flanges 12 and 13.

At intervals the flanges are provided with registering apertures 14 and 15, and the adjacent ends of the apertures are preferably enlarged as shown at 16 and 17. A gasket 18 of relatively compressible material is interposed between the flanges and has openings registering with the flange openings and of a size about that of the maximum dimension of the enlargements 16 and 17.

Bolts 19 are passed through the registering apertures. As here shown, the bolts have heads 20 abutting the top of flange 12 and have nuts 21 threaded on their lower ends and against flange 13 so that the flanges are drawn together to compress gasket 18 and provide a tight joint.

Each bolt 19, as here shown, is externally reduced, preferably by a circumferential groove 22 which when the bolt is operatively positioned is substantially in a trans-axial plane between flanges 12 and 13. Each bolt, moreover, has an axial bore 23 extending from the head end of the bolt past the reduced zone of the bolt.

A valve rod is formed of aligned sections 24 and 25, these having a tongue and groove connection in the zone of the flanges and being joined by a coupling nut 26, this arrangement being in the nature of that disclosed in Patent No. 2,018,455, issued October 22, 1935, to H. M. Lofton. The valve rod forms no part of the present invention and may be of any suitable construction, but preferably for the sake of avoiding injury thereto it is of sectional construction.

The flanges 12 and 13 are positioned at such a height that accidental impacts are received by the top portion 10. Under such an impact, the bolts, being relatively weak as compared to the flanges, will be sheared or pulled apart at the grooves 22. Rod portion 24 will separate from portion 25 in the manner described in the patent above mentioned so that the entire upper structure can fall to the ground without injury to the lower structure. In case the impact has not injured the upper stock portion it may be immediately reassembled with the lower by a new set of bolts, nut 26 also being replaced.

With a predetermined operative tensioning of the bolts their point of failure will be determined by the size of grooves 22 and bores 23. Actually, grooves 22 need be of no very great depth, since their principal purpose is to localize the break. The bolt strength is conveniently determined through selection of the diameter of the bores 23. Preferably the bores extend from the head end of the bolt rather than through the other end which is already weakened to some extent by the threads.

I have found that the bolts have much superior characteristics where the bore is used in conjunction with the groove than where an attempt is made to use a deeper groove alone. Accordingly, an important feature of the present invention is the control of the bolt characteristics by the provision of a bore of selected size.

Assuming a direct radial impact to be received by flange 12, the enlargements 16 and 17 permit a bending as well as a shearing action to take place with a superior effect to that obtainable by a purely shearing action. As the result of impacts higher up on portion 10 of the stock, this portion is tilted relative to the lower portion so that the bolts are subjected to a largely tensioning action and are pulled apart at the groove, bending being permitted as before.

It will be understood that changes in detail may be made from the illustrative disclosure herein and accordingly I do not limit myself except as in the following claims.

I claim:

1. A fire hydrant stock comprising tubular portions disposed in end to end relation, the adjacent ends of said portions having peripheral flanges with registering apertures, and connecting means for said portions comprising bolts in said apertures, each of said bolts being externally reduced in a transaxial plane between the flanges and each having an axial bore which extends through the zone of the groove, said apertures closely surrounding the end portions of the bolts but being enlarged adjacent the reduced portions of the bolts.

2. A fire hydrant stock comprising tubular portions disposed in end to end relation, the adjacent ends of said portions having peripheral flanges with registering apertures, and connecting means for said portions comprising bolts in said apertures, each of said bolts having a peripheral groove in a transaxial plane between the flanges and each having an axial bore which extends through the zone of the groove, said apertures closely surrounding the end portions of the bolts but being enlarged adjacent the reduced portions of the bolts.

EARL E. CLINE.